US012570347B2

(12) United States Patent 　(10) Patent No.: 　US 12,570,347 B2
Kalinowski et al. 　(45) Date of Patent: 　Mar. 10, 2026

(54) HUB MOTOR WITH INTEGRATED BRAKE

(71) Applicant: Rehrig Pacific Company, Los Angeles, CA (US)

(72) Inventors: Dane Gin Mun Kalinowski, Foothill Ranch, CA (US); Travis James Englert, Brea, CA (US)

(73) Assignee: Rehrig Pacific Company, Monterey Park, CA (US)

( * ) Notice: Subject to any disclaimer, the term of this patent is extended or adjusted under 35 U.S.C. 154(b) by 0 days.

(21) Appl. No.: 18/124,948

(22) Filed: Mar. 22, 2023

(65) Prior Publication Data

US 2023/0303144 A1 　Sep. 28, 2023

Related U.S. Application Data

(60) Provisional application No. 63/323,328, filed on Mar. 24, 2022.

(51) Int. Cl.
　*B62B 5/00* 　(2006.01)
　*B62B 3/06* 　(2006.01)
　*B62B 5/04* 　(2006.01)

(52) U.S. Cl.
　CPC ............ *B62B 5/004* (2013.01); *B62B 3/0612* (2013.01); *B62B 5/048* (2013.01)

(58) Field of Classification Search
　CPC ....... B62B 5/004; B62B 3/0612; B62B 5/048; B62B 3/06; B62B 5/00; B60B 35/12; B60K 7/00; B60K 17/04
　USPC ...................................................... 180/65.51
　See application file for complete search history.

(56) References Cited

U.S. PATENT DOCUMENTS

| | | | |
|---|---|---|---|
| 2,732,022 | A | 1/1956 | Lapsley et al. |
| 3,117,653 | A | 1/1964 | Altherr |
| 3,360,082 | A | 12/1967 | Grubis |
| 3,486,587 | A | 12/1969 | Malloy |
| 3,532,188 | A | 10/1970 | Norbert |
| 3,664,465 | A | 5/1972 | Holland |
| 3,812,928 | A | 5/1974 | Rockwell et al. |
| 3,890,669 | A | 6/1975 | Reinhards |
| 4,027,771 | A | 6/1977 | Adams |
| 4,258,831 | A | 3/1981 | Weber |
| (Continued) | | | |

FOREIGN PATENT DOCUMENTS

| | | |
|---|---|---|
| CN | 103253142 B | 10/2015 |
| CN | 105439043 A | 3/2016 |
| (Continued) | | |

OTHER PUBLICATIONS

International Search Report for International Application No. PCT/US2023/015922 dated May 22, 2023.

(Continued)

*Primary Examiner* — James A Shriver, II
*Assistant Examiner* — Hilary L Johns
(74) *Attorney, Agent, or Firm* — Carlson, Gaskey & Olds, P.C.

(57) 　　　　　ABSTRACT

A hub motor includes a hub motor body, an axle extending into the hub motor body, a rotor coupled to the outer housing, a stator within the rotor and coupled to the axle, and a brake within the hub motor body. The brake may include a brake pad spring-biased into braking engagement and moved out of braking engagement by an electromagnetic coil, such that the brake will fail into a braked state.

38 Claims, 8 Drawing Sheets

(56) References Cited

U.S. PATENT DOCUMENTS

| | | | |
|---|---|---|---|
| 4,349,937 | A | 9/1982 | Fontana |
| 4,424,885 | A | 1/1984 | Kedem |
| 4,669,561 | A | 6/1987 | Sheen |
| 4,706,328 | A | 11/1987 | Broeske |
| 4,816,998 | A | 3/1989 | Ahlbom |
| 4,835,815 | A | 6/1989 | Mellwig et al. |
| 4,887,830 | A | 12/1989 | Fought et al. |
| 5,325,938 | A | 7/1994 | King |
| 5,465,802 | A * | 11/1995 | Yang ..................... B60T 1/067 |
| | | | 310/67 R |
| 5,524,732 | A | 6/1996 | Koke |
| 5,531,295 | A | 7/1996 | Kopman et al. |
| 5,667,236 | A | 9/1997 | Murphy |
| 5,678,977 | A | 10/1997 | Nordlund |
| 5,722,515 | A | 3/1998 | Wyse |
| 5,752,584 | A | 5/1998 | Magoto et al. |
| 5,796,192 | A * | 8/1998 | Riepl ..................... H02P 3/04 |
| | | | 310/67 R |
| 5,927,441 | A | 7/1999 | Luo |
| 6,057,617 | A | 5/2000 | Schmid |
| 6,409,187 | B1 | 6/2002 | Crow, Jr. |
| 6,443,268 | B1 | 9/2002 | Dearth et al. |
| 6,454,512 | B1 | 9/2002 | Weiss |
| 6,464,025 | B1 | 10/2002 | Koeper et al. |
| 6,561,745 | B2 | 5/2003 | Rountree |
| 6,763,919 | B2 * | 7/2004 | Ikeda ..................... F16D 65/22 |
| | | | 188/196 R |
| 6,974,399 | B2 | 12/2005 | Lo |
| 7,255,206 | B1 | 8/2007 | Hackbarth et al. |
| 7,270,201 | B1 | 9/2007 | Cryer |
| 7,856,932 | B2 | 12/2010 | Stahl et al. |
| 7,987,797 | B2 | 8/2011 | Stahl et al. |
| 7,988,405 | B2 | 8/2011 | Ellington |
| 8,011,677 | B1 | 9/2011 | Ellington et al. |
| 8,075,244 | B2 | 12/2011 | Ellington |
| 8,079,606 | B2 | 12/2011 | Dull et al. |
| 8,282,111 | B2 | 10/2012 | Hailston et al. |
| 8,360,443 | B2 | 1/2013 | Ellington |
| 8,413,748 | B2 * | 4/2013 | Nishikawa ............... B62M 7/12 |
| | | | 180/65.51 |
| 8,758,178 | B2 | 6/2014 | Gunji et al. |
| 8,776,697 | B1 | 7/2014 | O'Connell |
| 8,783,420 | B2 | 7/2014 | Lai |
| 8,894,076 | B2 | 11/2014 | Hailston et al. |
| 8,910,953 | B2 | 12/2014 | Faulhaber |
| 8,950,759 | B2 | 2/2015 | Thorsen et al. |
| 9,108,657 | B2 | 8/2015 | Hussain |
| 9,260,125 | B2 | 2/2016 | Ellington et al. |
| 9,809,434 | B2 | 11/2017 | Magoto et al. |
| 9,908,549 | B2 | 3/2018 | Newell |
| 10,023,043 | B2 | 7/2018 | Johnson |
| 10,377,403 | B2 | 8/2019 | Lee et al. |
| 10,640,348 | B2 * | 5/2020 | Pan ..................... B66F 17/003 |
| 10,793,176 | B2 | 10/2020 | King et al. |
| 11,254,342 | B2 | 2/2022 | Kalinowski et al. |
| 2005/0199449 | A1 | 9/2005 | Tanksley et al. |
| 2008/0042381 | A1 | 2/2008 | Hartmann et al. |
| 2008/0164101 | A1 | 7/2008 | Stone |
| 2009/0183953 | A1 | 7/2009 | Ellington |
| 2009/0185890 | A1 | 7/2009 | Ellington |
| 2010/0243350 | A1 * | 9/2010 | Nishikawa ............... B62M 7/12 |
| | | | 180/65.51 |
| 2010/0295261 | A1 | 11/2010 | Ellington |
| 2011/0057405 | A1 | 3/2011 | Filasky |
| 2011/0061979 | A1 | 3/2011 | Tai |
| 2011/0171000 | A1 | 7/2011 | Hailston |
| 2012/0098218 | A1 | 4/2012 | Richard et al. |
| 2013/0202400 | A1 | 8/2013 | Richard et al. |
| 2013/0223962 | A1 | 8/2013 | Ellington et al. |
| 2014/0291594 | A1 | 10/2014 | Newell |
| 2015/0027824 | A1 * | 1/2015 | Pandya ................ A61G 5/1008 |
| | | | 188/164 |
| 2015/0133253 | A1 * | 5/2015 | Huang ................. B60K 7/0007 |
| | | | 475/149 |
| 2015/0225215 | A1 | 8/2015 | King et al. |
| 2015/0239527 | A1 * | 8/2015 | Huang ................... B62M 11/16 |
| | | | 475/149 |
| 2016/0107671 | A1 | 4/2016 | Wyse et al. |
| 2016/0303964 | A1 * | 10/2016 | Johnson ................... H02K 7/14 |
| 2017/0240194 | A1 | 8/2017 | Kalinowski et al. |
| 2017/0297881 | A1 | 10/2017 | King et al. |
| 2018/0162434 | A1 | 6/2018 | Kalonowski et al. |
| 2018/0334368 | A1 * | 11/2018 | Pan ........................ B62B 5/004 |
| 2019/0305638 | A1 | 10/2019 | Chi-Hsueh et al. |
| 2020/0269895 | A1 * | 8/2020 | Englert ................. B62B 3/0612 |
| 2021/0221218 | A1 * | 7/2021 | Li .......................... F16D 65/827 |
| 2021/0229719 | A1 | 7/2021 | Englert et al. |
| 2023/0133794 | A1 * | 5/2023 | Chen ..................... H02K 7/006 |
| | | | 180/220 |
| 2023/0303144 | A1 * | 9/2023 | Kalinowski ............. B62B 5/048 |

FOREIGN PATENT DOCUMENTS

| | | | | | |
|---|---|---|---|---|---|
| CN | 206023785 | U | 3/2017 | | |
| CN | 206270549 | U | 6/2017 | | |
| CN | 107303235 | A * | 10/2017 | .......... | H02K 7/1023 |
| CN | 206894433 | U | 1/2018 | | |
| CN | 207278735 | U | 4/2018 | | |
| CN | 208015539 | U | 10/2018 | | |
| CN | 208021179 | U | 10/2018 | | |
| CN | 109080444 | A | 12/2018 | | |
| CN | 110474508 | A | 11/2019 | | |
| CN | 110855088 | A | 2/2020 | | |
| CN | 210120461 | U | 2/2020 | | |
| CN | 210120462 | U | 2/2020 | | |
| CN | 210246422 | U | 4/2020 | | |
| CN | 210246516 | U | 4/2020 | | |
| CN | 210246577 | U | 4/2020 | | |
| CN | 210380554 | U | 4/2020 | | |
| CN | 210405053 | U | 4/2020 | | |
| CN | 210431046 | U | 4/2020 | | |
| CN | 210608838 | U | 5/2020 | | |
| CN | 210665966 | U | 6/2020 | | |
| CN | 111442042 | A | 7/2020 | | |
| CN | 212028393 | U | 11/2020 | | |
| CN | 212737608 | U | 3/2021 | | |
| CN | 213199781 | U | 5/2021 | | |
| CN | 213305155 | U | 5/2021 | | |
| CN | 113052482 | A | 6/2021 | | |
| CN | 213482920 | U | 6/2021 | | |
| CN | 213482925 | U | 6/2021 | | |
| CN | 213482926 | U | 6/2021 | | |
| CN | 213518373 | U | 6/2021 | | |
| CN | 213521549 | U | 6/2021 | | |
| CN | 113065623 | A | 7/2021 | | |
| CN | 113067891 | A | 7/2021 | | |
| CN | 113129552 | A | 7/2021 | | |
| CN | 213637329 | U | 7/2021 | | |
| CN | 213716649 | U | 7/2021 | | |
| CN | 213919796 | U | 8/2021 | | |
| CN | 213932599 | U | 8/2021 | | |
| CN | 213934630 | U | 8/2021 | | |
| CN | 213937589 | U | 8/2021 | | |
| CN | 113490620 | A | 10/2021 | | |
| CN | 214412612 | U | 10/2021 | | |
| DE | 3018690 | A1 | 12/1981 | | |
| DE | 19837270 | A1 | 2/2000 | | |
| EP | 1160475 | A2 | 12/2001 | | |
| EP | 1728670 | A1 | 12/2006 | | |
| EP | 2019015 | A3 | 8/2011 | | |
| EP | 1808402 | B1 | 11/2011 | | |
| EP | 3131185 | A1 | 2/2017 | | |
| EP | 3865330 | A1 * | 8/2021 | .............. | H02K 9/19 |
| GB | 2190063 | A | 11/1987 | | |
| KR | 20110023998 | A | 3/2011 | | |

OTHER PUBLICATIONS

Uline Pallet Truck Model No. H-4121; retrieved Mar. 14, 2015; https://www.uline.com/Product/Detail/H-4121/Pallet-Trucks/Uline-Pallet-Truck-Hand-Brake-48-x-27.

(56)         References Cited

OTHER PUBLICATIONS

International Preliminary Report on Patentability for International Application No. PCT/US2023/015922 dated Oct. 3, 2024.
Office Action for European Application No. 23717722.5 dated Jul. 1, 2025.

* cited by examiner

HUB MOTOR WITH INTEGRATED BRAKE

BACKGROUND

A powered delivery sled having a compact electric hub motor is currently being sold by the assignee of the present invention to provide a manual push mode, powered drive assist mode and full powered drive mode to deliver product from a trailer to a store. The current hub motor provides a great solution for delivery but requires a separate parking brake to hold the sled at a standstill when stopped.

The current hub motor has the ability to utilize the electromagnetic windings to apply a brake when powered. However, the current hub motor does not have any sort of integrated parking brake or friction brake feature and typically relies on another system to hold the product at a standstill.

SUMMARY

Several embodiments disclosed herein build upon the existing hub motor to integrate a parking brake or friction brake into the hub motor to maintain the compact, full power packaging. The integration of the brake gives the compact hub motor package full capability similar to an electric pallet jack drive but in a smaller, lighter weight package.

This allows for lighter, more compact equipment to be more full-featured for deliveries up and down ramps, throughout parking lots, etc. while still being able to get into tight restaurants and coolers.

Optionally, the parking brake may also assist the hub motors in slowing the sled down, e.g. when on ramps.

The parking brake could be electrical, non-electrical, mechanical, internal and/or external to the hub motor. Since making it electrical may be an issue if the battery dies, one option disclosed herein is to automatically apply the parking brake when the unit is without battery, i.e. the brake will fail to the braked status.

DETAILED DESCRIPTION

Figure 1:
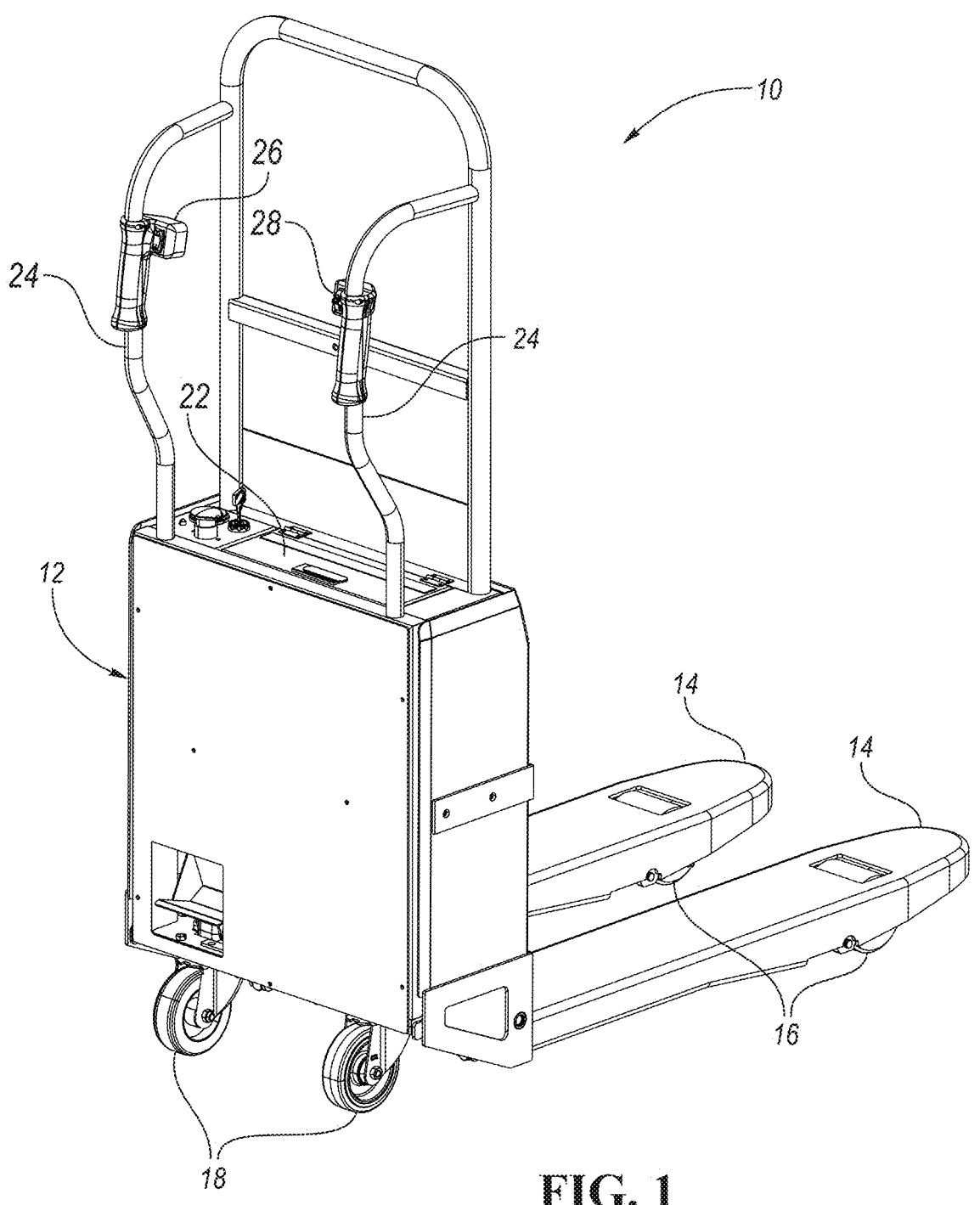
FIG. 1 shows an example pallet sled in which the hub motor brake is used.

An example of a powered sled 10 for transporting objects such as pallets is shown in FIG. 1. The sled 10 includes a lift module or base 12 connected to a pair of tines 14 extending forward of the base 12. The base 12 can raise and lower the tines 14, such as by leveraging the load wheels 16 supporting outer ends of the tines 14. Casters 18 may support the base 12.

A battery 22 is also mounted in the base 12 for driving motors within the load wheels 16, as will be explained below. Upright handles 24 extend upward from the base 12. Alternatively, the sled 10 could have a pivotable tiller arm for steering a rear wheel supporting the base, similar to a traditional pallet jack. A lift control lever 26 is connected to the handles 24. A throttle control lever 28 is also connected to the handles 24. The load wheels 16 include hub motors. The hub motors selectively receive power from the battery 22 to drive the load wheels 16 rotatably. Both hub motors may be controlled by the single throttle lever 28. One or more planetary gearsets may connect the hub motor to the load wheel 16.

Figure 2:
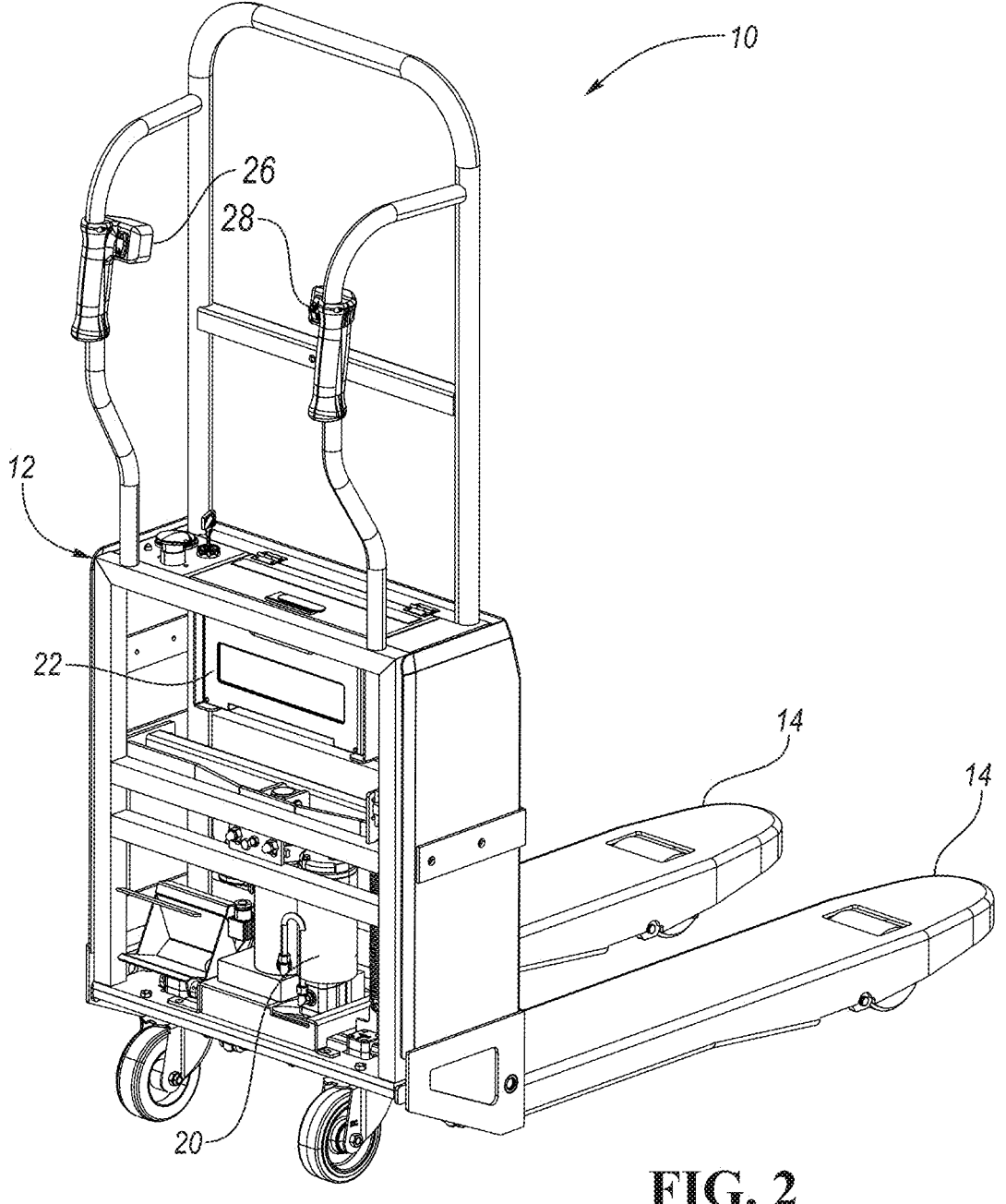
FIG. 2 shows the pallet sled of FIG. 1 with a back panel removed.

FIG. 2 shows the sled 10 with a rear cover removed. The sled 10 that is shown includes an electro-hydraulic pump 20 for raising and lowering the tines 14. The pump 20 may be powered by the removable battery 22. Alternatively, a hydraulic foot pump or other mechanism for lifting the tines 14 may be utilized.

Figure 3:
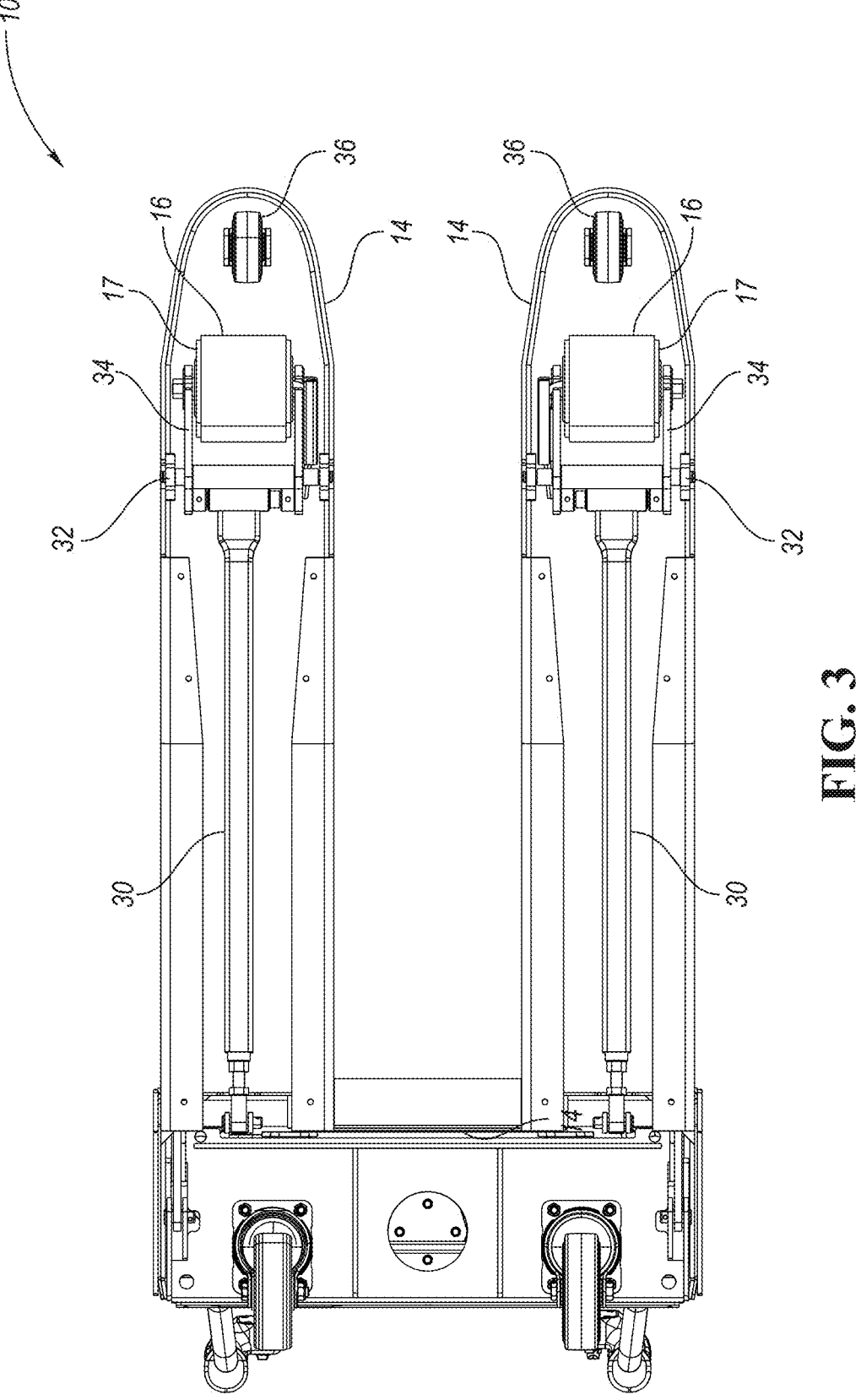
FIG. 3 is a bottom view of the pallet sled of FIG. 1.

FIG. 3 is a bottom view of the sled 10. Referring to FIG. 3, each load wheel 16 is mounted at the end of a pair of arms 34, which are pivotably mounted at opposite ends to the tine 14 at pivot axis 32. As is well-known, a push rod 30 leverages the arms 34 up and down to raise and lower the load wheels 16. In this example, the push rods 30 are powered by the pump 20 (FIG. 2) as controlled by the lift control lever 26 (FIG. 1).

The load wheels 16 include hub motors 17. The hub motors 17 selectively receive power from the battery 22 (FIG. 1) to drive the load wheels 16 rotatably. Both hub motors 17 may be controlled by the single throttle lever 28 (FIG. 1). Alternatively, dual throttle controls (one for each hub motor 17) would allow the operator to steer the sled 10. A free spinning lead wheel 36 is mounted at the front of each tine 14 and spaced above the floor (FIG. 4) to assist in contact with curbs, ramps, etc. As another alternative, a hub motor 17 may be provided in only one of the load wheels 16, while the other load wheel is free spinning.

Figure 4:
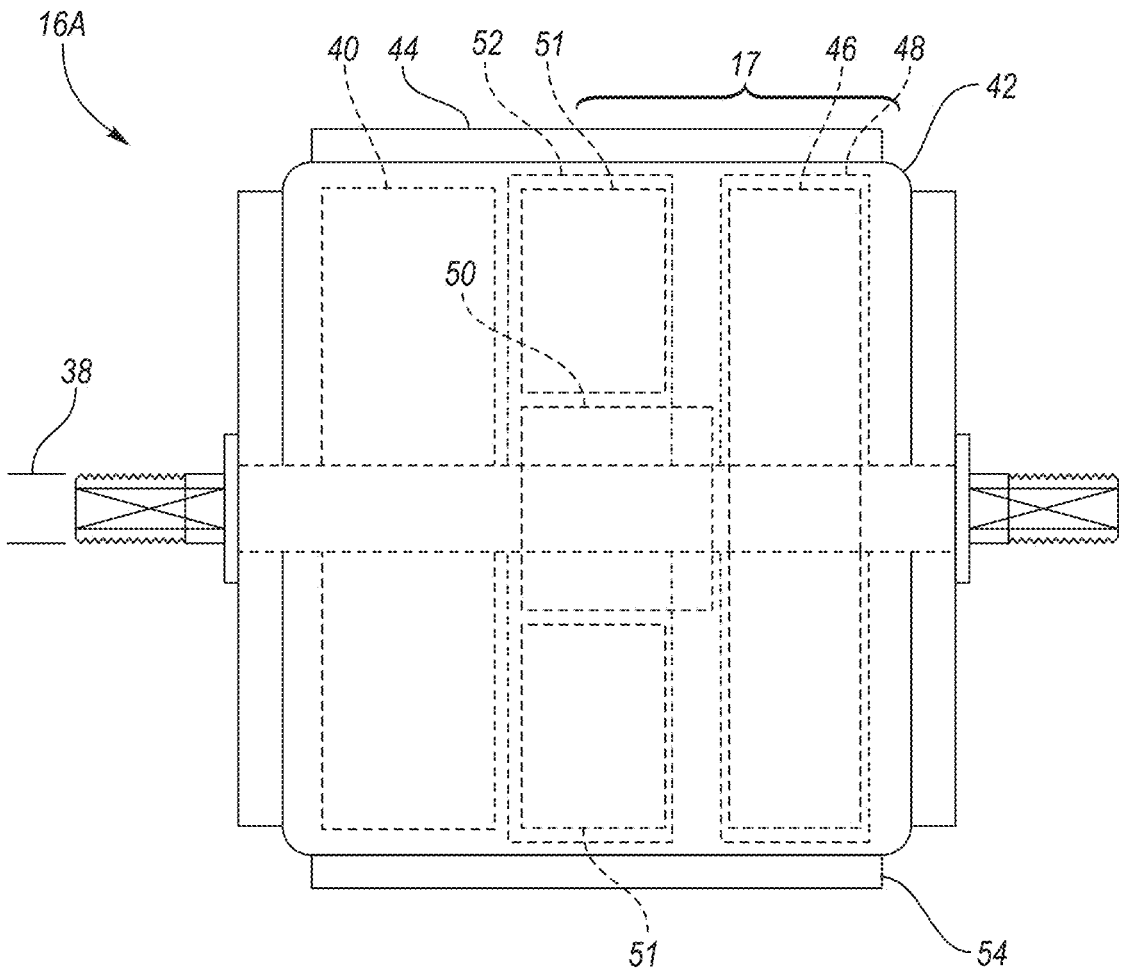
FIG. 4 shows one arrangement of the wheel assembly with integrated brake that could be used in the pallet sled of FIG. 1.

FIG. 4 shows one embodiment of a load wheel 16A that could be used as one or both of the load wheels 16 in the pallet sled 10 of FIG. 1. The load wheel 16A has an axle 38 extending therethrough and integrates a brake assembly 40 within the hub motor body 42 or housing. The brake assembly 40 may be an electric pallet jack (EPJ) style electromagnetic (EM) brake. Alternatively, the brake assembly 40 may be a drum brake or a pawl brake.

There may be a tread 44 on the outer surface of the hub motor body 42. The hub motor 17 and the brake assembly 40 are both within the hub motor body 42 and within the tread 44. According to one known configuration, the hub motor 17 includes a stator 46 fixed to the axle 38. A rotor 48 circumscribes the stator 46 and is rotatable relative to the stator 46, the axle 38 and the hub motor body 42. The rotor 48 is connected to a planetary gearset which is in turn coupled to a ring gear 52, which is fixed to the hub motor body 42. More specifically, the rotor 48 is fixed to a sun gear 50 which is coupled to a plurality of planet gears 51 (two are illustrated, but three or more would likely be used). The planet gears 51 engage the inner circumference of the ring gear 52. The ring gear 52 is fixed to the hub motor body 42.

In use, the hub motor 17 (e.g. one in each load wheel 16) may have power selectively applied thereto to power the pallet sled 10 (FIG. 1). More specifically, the stator 46 drives the rotor 48 rotatably about the axle 38. The rotating rotor 48 drives the sun gear 50, which is coupled via the planet gears 51 to the ring gear 52. The ring gear 52 is fixed to the interior of the hub motor body 42, so the hub motor body 42 is rotatably driven about the axle 38.

To slow down or provide a controlled descent down a ramp or other incline, the user can apply a braking force to the hub motor body 42 via controlling the stator 46. When parked or otherwise not rolling, the brake assembly 40 can also be applied. The brake assembly 40 couples the hub motor body 42 to the axle 38, thereby preventing (or inhibiting) relative rotation between the two. As will be explained below, the brake assembly 40 may have a "fail on" feature, i.e. if power to the brake assembly 40 is disconnected, the brake assembly 40 applies a braking force tending to inhibit rotation of the hub motor body 42 relative to the axle 38.

Figure 5:
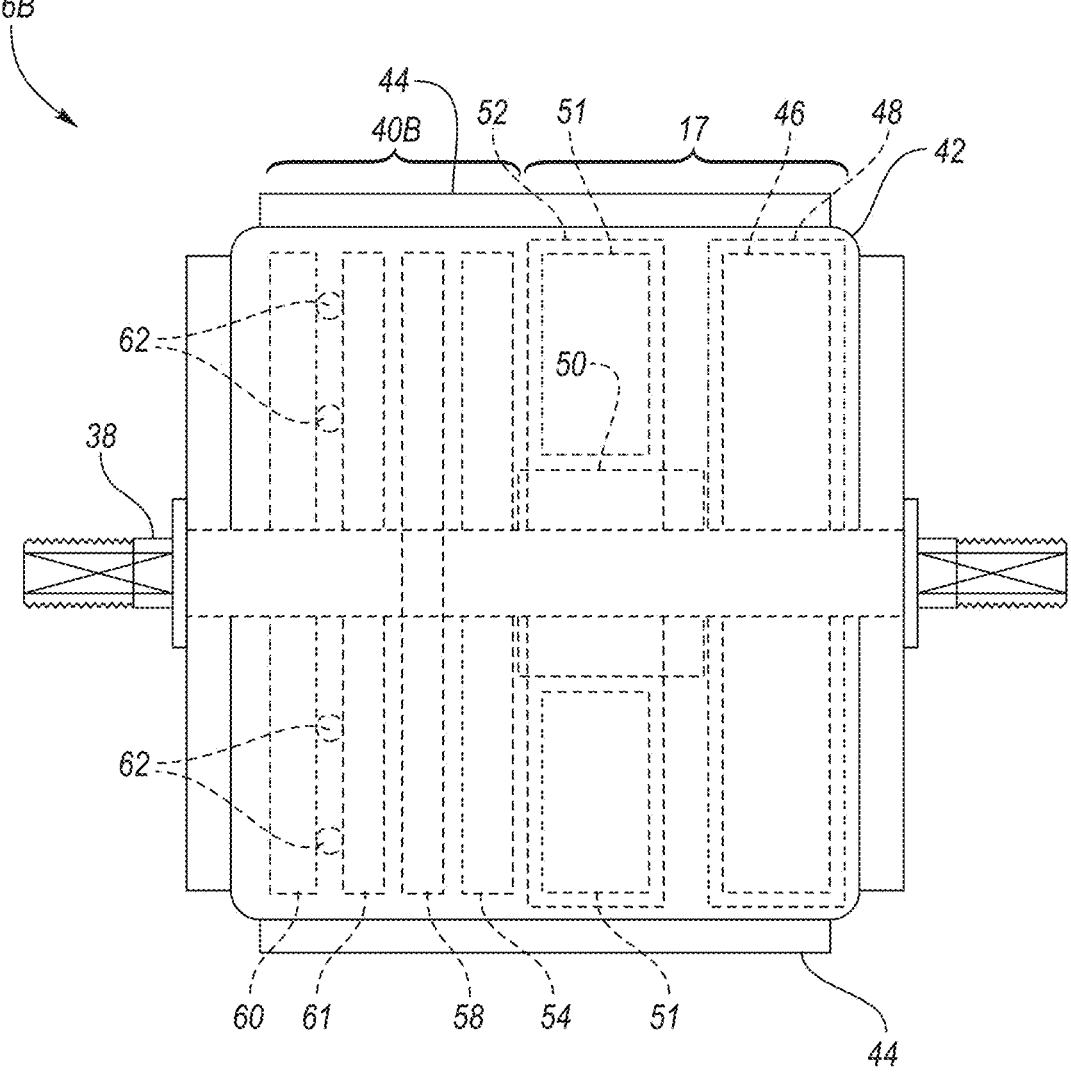
FIG. 5 shows one possible specific implementation of the wheel assembly of FIG. 4 with a first example brake assembly.

FIG. 5 shows a load wheel 16B which is one specific example implementation of the load wheel 16A of FIG. 4 in which the brake assembly 40 is a disk brake assembly 40B. The motor portion of the load wheel 16B is the same as that of FIG. 4, i.e. the stator 46, rotor 48, sun gear 50, planet gears 51, and ring gear 52 are the same as in FIG. 4.

The brake assembly 40B includes a friction disk 54, a brake pad 58 and an electromagnetic pressure plate assembly 60, each annular in shape so as to be received on the axle 38 of the load wheel 16A. The friction disk 54 is fixed to the sun gear 50 (or alternatively, the hub motor body 42) so that it rotates about the axle 38 with the sun gear 50 (or with the hub motor body 42). The electromagnetic pressure plate assembly 60 is fixed to the axle 38 (and/or fixed to some external structure but fixed relative to the axle 38). The brake pad 58 is rotatably coupled to the axle 38 and slidable relative to the axle 38 along the axis of the axle 38. The brake pad 58 is normally slightly spaced away from both the electromagnetic pressure plate assembly 60 and the friction disk 54.

Within the electromagnetic pressure plate assembly 60, a plurality of springs 62 bias a pressure plate 61 toward the brake pad 58. The pressure plate 61 is slidable axially relative to the axle 38. When permitted, the springs 62 bias the pressure plate 61 into the brake pad 58, thereby sliding the brake pad 58 forcibly toward the friction disk 54 to lock the hub motor body 42 to the axle 38. When the electromagnetic pressure plate assembly 60 is activated, the pressure plate 61 is drawn away from the brake pad 58 (e.g. by an electromagnetic coil), thereby compressing the springs 62 such that brake pad 58 is spaced from both the pressure plate 61 and the friction disk 54. A wire harness connects the electromagnetic pressure plate assembly 60 to a controller of the sled 10 and/or a parking brake button for the user.

The brake assembly 40B operates as a fail-on brake and utilizes the springs 62 to compress the brake pad 58 against the friction disk 54, which is fixedly secured to the hub motor body 42. When the brake assembly 40B is energized upon turning the sled 10 on or engaging the throttle (for example), the coils in the electromagnetic pressure plate assembly 60 charge and pull the brake pad 58 away from the friction disk 54, thereby unlocking the hub motor body 42 from the axle 38, so that the hub motor body 42 can rotate about the axle 38.

When the user parks the sled 10, the user can press a button, turn a key, pull a lever, etc, to activate the brake assembly 40B as a parking brake. The sled 10 disconnects power from the electromagnetic pressure plate assembly 60, thereby permitting the springs 62 to press the brake pad 58 against the friction disk 54, thereby locking the hub motor body 42 relative to the axle 38, i.e. locking the load wheel 16B against rotation.

This embodiment largely utilizes an electromagnetic brake mechanism but repackaged into the hub motor body 42 (i.e. within the same housing) inline with the hub motor 17 and gearset. Having the brake internalized within the hub motor body 42 allows the load wheel 16B to have a wider tread 44 to match the overall footprint. The load wheel 16B of FIG. 5 could be used as the load wheels 16 of FIGS. 1-3.

Figure 6:
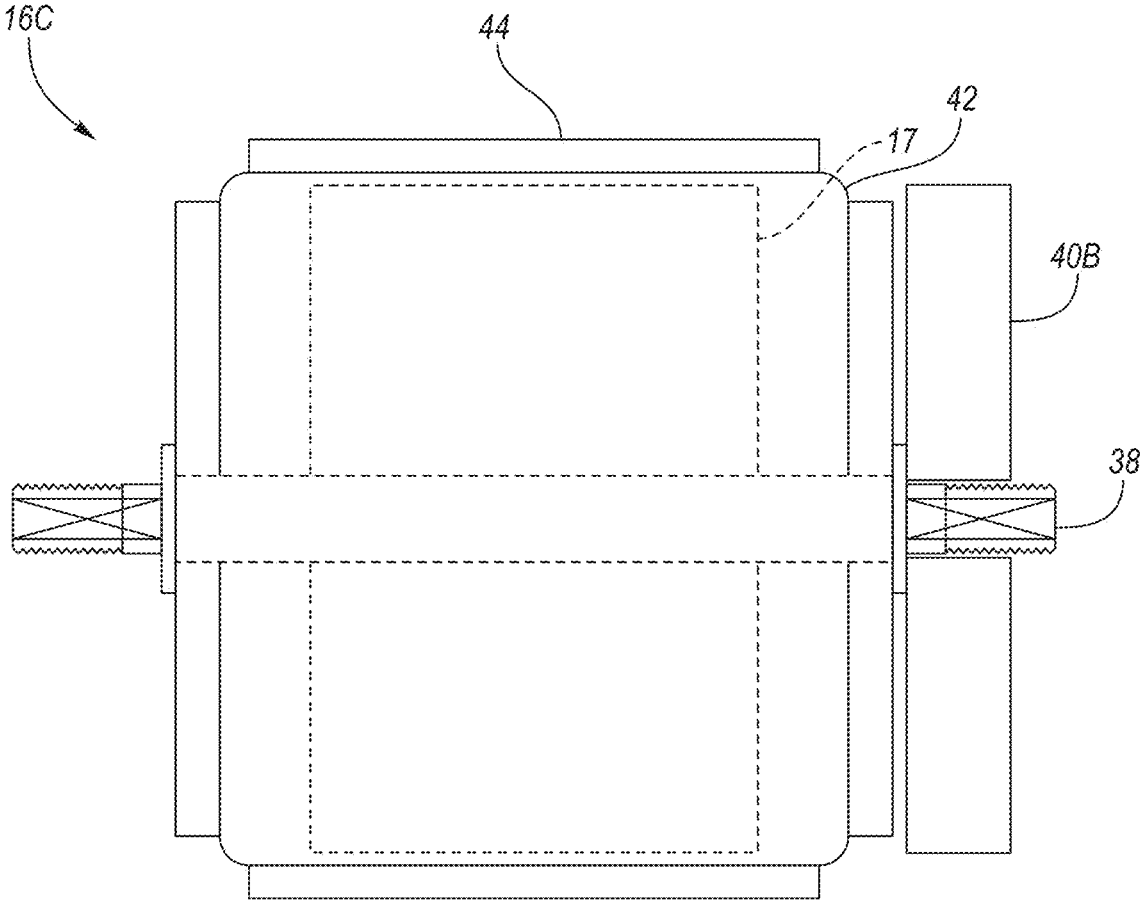
FIG. 6 shows a second possible implementation of the wheel assembly with integrated brake of FIG. 4.

If packaging within the hub motor body is an issue, the brake assembly 40B could be mounted external to the hub motor and still remain inline with the rotation axis, as shown in FIG. 6. The external brake assembly 40B may shorten the length of the tread 44 while maintaining the same, wide overall footprint. The load wheel 16C of FIG. 6 could be used as the load wheels 16 of FIGS. 1-3.

Figure 7:
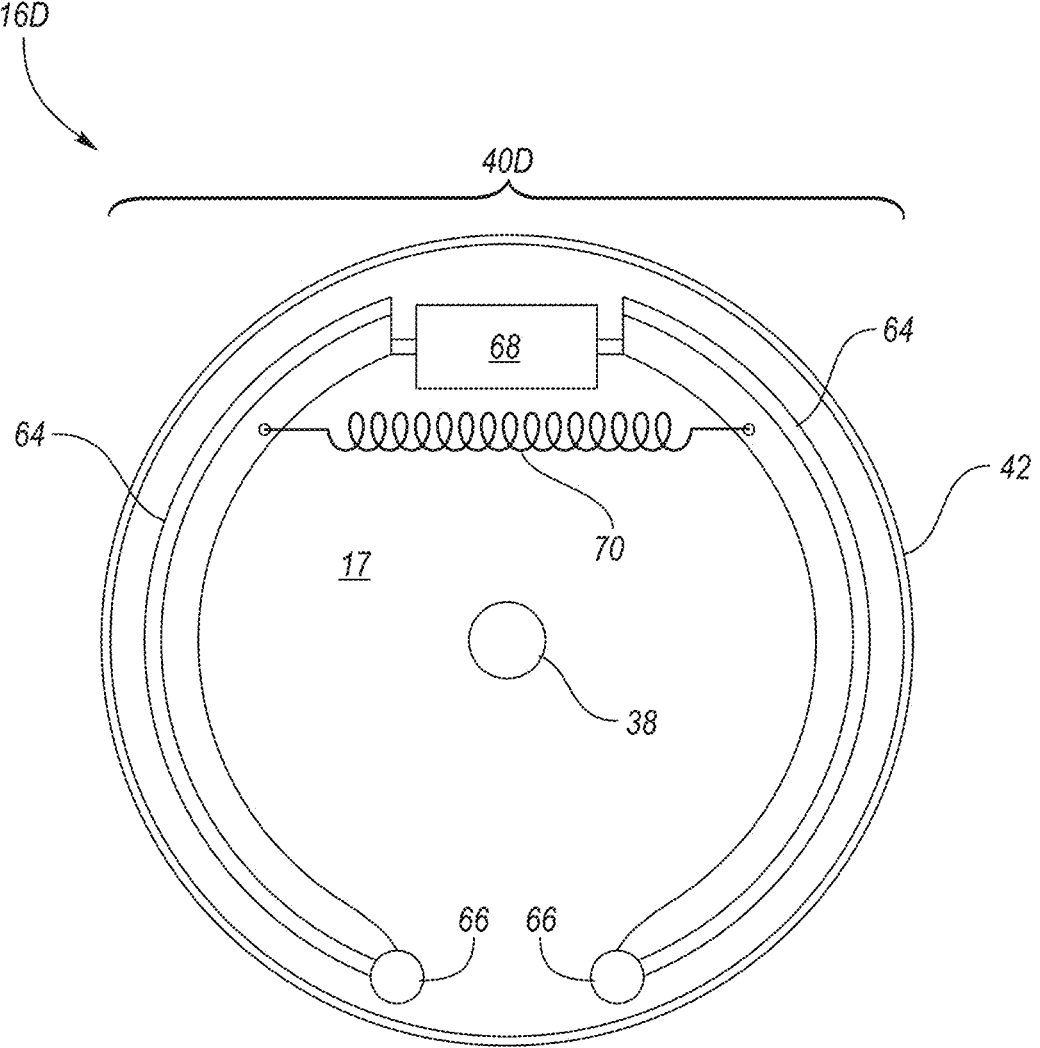
FIG. 7 shows a third possible implementation of the wheel assembly with integrated brake of FIG. 4.

In another embodiment shown in FIG. 7, a drum brake assembly 40D is integrated within the hub motor body 42 of a load wheel 16D that can be used as the load wheels 16 in the pallet sled 10 of FIGS. 1-4. The drum brake assembly 40D could be used as the brake assembly 40 of FIG. 4, again adjacent the hub motor 17 and within the hub motor body 42. The drum brake assembly 40D includes at least one (preferably two) brake shoes 64 pivotally mounted to the pallet sled 10 (i.e. fixed relative to the axle 38) at two pivot points 66. An actuator 68 (such as hydraulic, or electric, or manual via linkage, etc) is connected to the opposite ends of the brake shoes 64. A spring 70 also connects the ends of the brake shoes 64 away from the pivot points 66. Preferably, the spring 70 biases the brake shoes 64 away from one another, i.e. such that they pivot on the two pivot points 66 into the inner surface of the hub motor body 42. When activated, the actuator 68 pulls the ends of the brake shoes 64 toward one another, i.e. away from the inner surface of the hub motor body 42.

The electrically controlled drum brake assembly 40D holds the hub motor 17 and load wheel 16D stationary when engaged (i.e. when no power is applied to the actuator 68 to prevent the hub motor 17 and load wheel 16D from rotating. The drum brake assembly 40D is mounted within the hub motor body 42 of the hub motor hub motor 17 and uses the actuator 68 to counter the spring 70 that applies the brake shoes 64 radially outward against the inside diameter of the hub motor body 42, which acts as the brake drum. Again, if power to the actuator 68 is cut, the spring 70 applies the brake.

As in the previous embodiment, the drum brake assembly 40D could automatically engage and disengage, or be activated by the operator.

In another embodiment, not illustrated, the drum brake assembly 40D may be integrated external to the hub motor body 42. This embodiment is similar to the previous embodiment, but the drum brake assembly 40D is mounted outside the hub motor body 42 of the hub motor 17 and applies brake shoes or brake pads directly against the outside diameter of the hub motor body 42 tread 44 to prevent the hub motor 17 from rotating.

Figure 8:
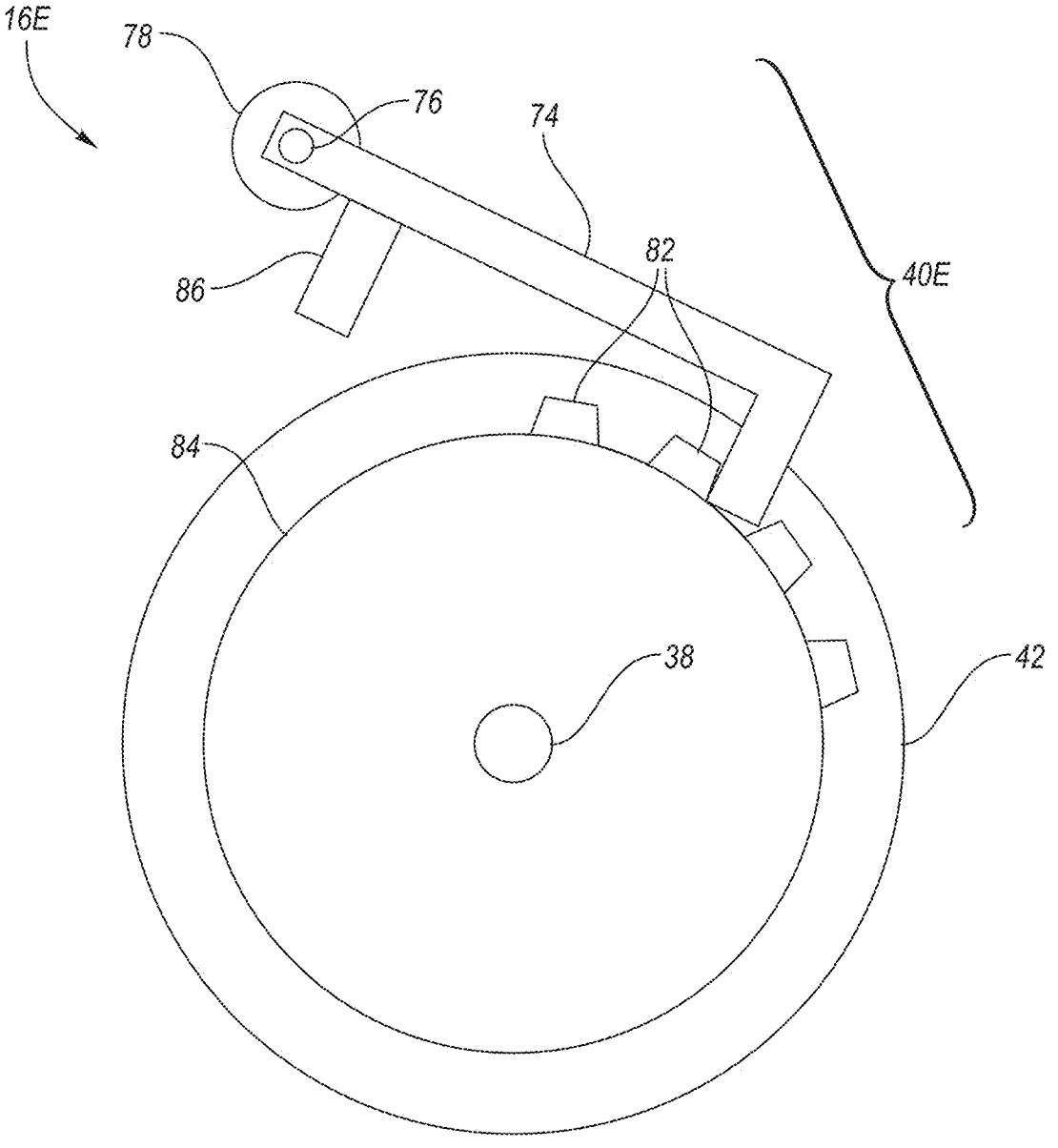
FIG. 8 shows a fourth possible implementation of the wheel assembly with integrated brake of FIG. 4.

FIG. 8 shows another embodiment of a hub motor 16E that could be used in the pallet sled 10 of FIG. 1. A parking pawl brake assembly 40E can be integrated with the hub motor body 42. The parking pawl brake assembly 40E includes a pawl 74 pivotably coupled to the pallet sled 10 (FIG. 1) about a pivot point 76. A spring 78 (such as a torsion spring) biases the pawl 74 in a rotatable direction such that the opposite end of the pawl 74 is biased into engagement with a plurality of teeth 82 on a drum 84 that is coupled to the hub motor body 42, the sun gear 50 (FIG. 4), the ring gear 52 (FIG. 4), or other rotating component. An actuator 86 is configured to pivot the pawl 74 out of engagement. The actuator 86 may be an electric actuator, such that it releases in the absence of power.

The parking pawl brake assembly 40E locks the hub motor 17 internally when engaged, to prevent the hub motor body 42 from rotating relative to the axle 38 or the remainder of the pallet sled 10. This is similar to how a parking pawl functions within an automatic transmission by locking the rotation of the output shaft, but the hub motor shaft does not rotate. Therefore, instead, the pawl 74 could engage with the existing sun gear, planet gears or ring gear of the planetary gearset. The pawl 74 could also engage with a new internal component that interacts with the ring gear or directly on notches on the inside diameter of the hub motor body 42.

The electrically controlled actuator 86 could be configured to automatically engage and disengage the pawl parking brake assembly 40E based on hub motor body 42 rotation. If the hub motor body 42 is stopped, the pawl parking brake assembly 40E would automatically be applied by disengaging the actuator 86 and permitting the spring 78 to bias the pawl 74 into the teeth 82. When the hub motor starts driving, the pawl parking brake assembly 40E would automatically be disengaged, e.g. by activating the actuator 86 to move the pawl 74 away from the teeth 82. The pawl parking brake assembly 40E could also be activated by the operator and controls would be in place to ensure the pawl parking brake assembly 40E can only be set when the hub motor has stopped rotating.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A hub motor comprising:
   a hub motor body;
   a rotor connected to a sun gear of a planetary gearset, wherein the sun gear is coupled to a ring gear by a plurality of planet gears, and the ring gear is coupled to the hub motor body such that the rotor and the hub motor body are rotatable about an axis;
   a stator within the rotor and the hub motor body, wherein the rotor and the hub motor body are rotatable relative to the stator; and
   a brake within the hub motor body, the brake including a friction disk coupled to the sun gear.

2. The hub motor of claim 1 wherein the brake includes at least one spring biasing a brake pad into braking engagement, wherein the at least one spring and brake pad are within the hub motor body.

3. The hub motor of claim 2 wherein the brake further includes at least one coil preventing braking engagement of the brake pad when the at least one coil is energized, wherein the at least one coil is positioned within the hub motor body.

4. The hub motor of claim 3 further including a tread on an outer surface of the hub motor body, wherein the brake is positioned completely within an envelope defined by the tread.

5. The hub motor of claim 1 wherein the brake engages to inhibit relative rotation between the hub motor body and the stator in an absence of power applied to the brake.

6. The hub motor of claim 1 wherein the brake includes at least one electromagnetic coil within the hub motor body.

7. The hub motor of claim 1 further including an axle extending through the hub motor body and protruding from opposite ends of the hub motor body.

8. The hub motor of claim 1 further including a planetary gearset coupling the rotor to the hub motor body.

9. The hub motor of claim 8 wherein the planetary gearset includes a sun gear coupled to the rotor and a ring gear fixed to the hub motor body, the planetary gearset further including planet gears engaging the ring gear and the sun gear, the hub motor further including a friction disk fixed to one of the sun gear or the hub motor body, the brake including a brake pad coupled to an axle and slidable along an axis of the axle toward and away from the friction disk.

10. The hub motor of claim 9 wherein the brake includes at least one spring biasing the brake pad into braking engagement with the friction disk, the brake further includes at least one coil preventing braking engagement of the brake pad with the friction disk when the at least one coil is energized, wherein the at least one coil is positioned within the hub motor body.

11. The hub motor of claim 10 further including a tread on an outer surface of the hub motor body, wherein the brake is positioned completely within an envelope defined by the tread.

12. A pallet sled including a base and at least one tine extending forward of the base, the pallet sled further including at least one hub motor of claim 1 powering a load wheel supporting an outer end of the at least one tine.

13. The hub motor of claim 1 wherein the brake includes a brake pad, wherein the brake selectively biases the brake pad against the friction disk.

14. The hub motor of claim 13 wherein the brake pad is slidable along the axis.

15. The hub motor of claim 14 wherein further including at least one spring biasing a pressure plate toward the brake pad.

16. The hub motor of claim 1 further including a tread on an outer surface of the hub motor body, wherein the brake is positioned within the tread and wherein the stator is within the tread.

17. A hub motor comprising:
    a hub motor body;
    a rotor coupled to the hub motor body such that the rotor and the hub motor body are rotatable about an axis;
    a stator within the rotor and the hub motor body, wherein the rotor and the hub motor body are rotatable relative to the stator;
    a brake within the hub motor body, wherein the brake includes at least one brake shoe, wherein the at least one brake shoe is within the hub motor body;
    at least one spring biasing the at least one brake shoe toward braking engagement to inhibit rotation of the hub motor body relative to the stator; and
    an actuator configured to move the at least one brake shoe away from braking engagement when activated, wherein the actuator is within the hub motor body.

18. A pallet sled including a base and at least one tine extending forward of the base, the pallet sled further including at least one hub motor of claim 17 powering a load wheel supporting an outer end of the at least one tine.

19. A hub motor comprising:
    a hub motor body;
    an axle extending into the hub motor body;
    a rotor coupled to the hub motor body;
    a stator within the rotor and coupled to the axle; and a brake within the hub motor body, wherein the brake includes at least one pawl selectively engaging teeth to inhibit rotation of the hub motor body relative to the axle.

20. The hub motor of claim 19 further including at least one spring biasing the at least one pawl toward braking engagement to inhibit rotation of the hub motor body relative to the axle.

21. The hub motor of claim 20 further including an actuator configured to move the at least one pawl away from braking engagement when activated.

22. A pallet sled including a base and at least one tine extending forward of the base, the pallet sled further including at least one hub motor of claim 19 powering a load wheel supporting an outer end of the at least one tine.

23. A pallet sled comprising:

a base;

a pair of tines extending forward of the base; and a wheel supporting the pallet sled below each of the pair of tines, wherein each wheel includes a hub motor therein, the hub motor including a hub motor body, a rotor, and a stator, wherein the rotor is coupled to rotate with the hub motor body relative to the stator, wherein the stator is within the rotor, the rotor connected to a sun gear of a planetary gearset, wherein the sun gear is coupled to a ring gear by a plurality of planet gears, and the ring gear is coupled to the hub motor body such that the rotor and the hub motor body are rotatable about an axis, wherein the hub motor further includes a brake within the hub motor body for selectively inhibiting relative rotation between the hub motor body and the stator.

24. The pallet sled of claim 23 wherein the brake includes at least one spring biasing a brake pad into braking engagement to inhibit relative rotation between the hub motor body and the stator.

25. The pallet sled of claim 24 wherein the brake further includes at least one coil preventing braking engagement of the brake pad when the at least one coil is energized.

26. The pallet sled of claim 25 wherein the at least one coil is positioned within the hub motor body.

27. The pallet sled of claim 26 wherein the wheel further includes a tread on an outer surface of the hub motor body, wherein the brake is positioned within the tread.

28. The pallet sled of claim 23 wherein the hub motor further includes a planetary gearset coupling the rotor to the hub motor body, wherein the planetary gearset includes a sun gear coupled to the rotor and a ring gear fixed to the hub motor body, the planetary gearset further including planet gears engaging the ring gear and the sun gear, the hub motor further including a friction disk fixed to one of the sun gear or the hub motor body, the brake including a brake pad slidable toward and away from the friction disk.

29. The pallet sled of claim 28 wherein the brake includes at least one spring biasing the brake pad into braking engagement with the friction disk, the brake further includes at least one coil preventing braking engagement of the brake pad with the friction disk when the at least one coil is energized, wherein the at least one coil is positioned within the hub motor body.

30. A pallet sled comprising:

a base;

at least one tine extending forward of the base;

a wheel supporting the pallet sled, wherein the wheel includes a hub motor therein, the hub motor including a hub motor body, a rotor and a stator, wherein the rotor is coupled to the hub motor body, wherein the stator is within the rotor and the hub motor body, wherein the hub motor further includes a planetary gearset coupling the rotor to the hub motor body, wherein the planetary gearset includes a sun gear coupled to the rotor and a ring gear fixed to the hub motor body, the planetary gearset further including planet gears engaging the ring gear and the sun gear; and a brake assembly configured to brake the hub motor body.

31. The pallet sled of claim 30 wherein the brake assembly is within the hub motor body.

32. The pallet sled of claim 30 wherein the brake assembly includes a disk brake.

33. The pallet sled of claim 30 wherein the brake assembly and the planetary gearset are within the hub motor body.

34. The pallet sled of claim 30 wherein the brake assembly includes a brake shoe.

35. A pallet sled comprising:

a base;

at least one tine extending forward of the base;

a wheel supporting the pallet sled, wherein the wheel includes a hub motor therein, the hub motor including a hub motor body, an axle extending into the hub motor body, a rotor coupled to the hub motor body, a stator within the rotor and coupled to the axle; and a brake assembly configured to brake the hub motor body, wherein the brake assembly includes a pawl.

36. A hub motor comprising:

a hub motor body, a tread on an outer surface of the hub motor body;

a rotor connected to a sun gear of a planetary gearset, wherein the sun gear is coupled to a ring gear by a plurality of planet gears, and the ring gear is coupled to the hub motor body such that the rotor and the hub motor body are rotatable about an axis;

a stator within the rotor, within the hub motor body and within the tread, wherein the rotor and the hub motor body are rotatable relative to the stator; and a brake positioned within the hub motor body and within the tread and configured to prevent or inhibit relative rotation between the hub motor body and the stator.

37. The hub motor of claim 36 wherein the brake includes at least one spring biasing a brake pad into braking engagement, wherein the at least one spring and brake pad are within the hub motor body.

38. A pallet sled including a base and at least one tine extending forward of the base, the pallet sled further including at least one hub motor of claim 36 powering a load wheel supporting an outer end of the at least one tine.

* * * * *